3,711,299
EGG WHITE COMPOSITION AND PROCESS OF MAKING SAME

Homer F. Ziegler, Jr., St. Louis County, Mo., assignor to Anheuser-Busch, Inc., St. Louis, Mo.
No Drawing. Filed Nov. 19, 1965, Ser. No. 508,827
Int. Cl. A23j 3/02
U.S. Cl. 99—113       36 Claims

ABSTRACT OF THE DISCLOSURE

A method and composition for reducing the whip time of egg whites comprising guar gum. A synergistic effect is achieved by a combination of guar gum and a chemical whip time reducing agent. A combination of guar gum, okra gum and a chemical whip time reducing agent is also effective to reduce whip time of egg whites.

---

The present invention relates to a new and improved egg white product and a process for making such an egg white product. The invention further relates to a method of improving the whipping characteristics of both dried egg whites and frozen egg whites. The invention also relates to the improved quality of cakes prepared with the improved egg white product.

Various plant gums have been used in preparation of food products, all having a general characteristic of thickening and giving body to the individual food products such as ice cream, gravy bases and salad dressings. The addition of most of these gums such as gum arabic, gum karaya, locust bean gum, gum tragacanth, as well as alginates, carboxymethylcellulose, etc. have little or no effect upon the whip time of dried egg whites.

My co-pending application, Ser. No. 108,992 discloses that okra gum, when added to egg white solids at a small but effective level, decreases the whip time of reconstituted dried egg white. Serial No. 108,992 also discloses that okra gum, plus a second whip time decreasing agent of the surface active type, produces a synergistic effect in decreasing the whip time of reconstituted dried egg whites.

It has now been found that one other gum of the many tested also decreases the whip time of dried eggs alone or synergistically with another agent which will decrease whip time. Further, it has been found that guar gum has this whip time decreasing effect either on dried egg whites or liquid egg whites.

The whip time decreasing effect is most noticeable in egg whites with a slow whip time. The combination of a whip time decreasing agent of the surface active type, okra gum and guar gum together produces the greatest decrease in whip time, whereas the combination of guar gum and okra gum, when incorporated into egg whites, does not have any greater effect on whip time than the same amount of either gum used alone.

The whip time of liquid or dried egg whites is prolonged if adverse processing conditions are used, or if small amounts of egg yolk or other whip time prolonging substances are in the finished egg whites. For dried egg whites the denaturization of egg protein, as well as egg yolk contamination, prolongs whip time. For frozen egg whites, egg yolk contamination, pasteurization and other unknown factors may increase the whip time. For egg whites with slow whip time, i.e., well above 5 minutes, guar gum or guar gum plus a surface active type whip time decreasing agent, or guar gum, okra gum and a surface active type whip time decreasing agent will significantly decrease whip time, produce a more stable foam and result in baked products with a greater volumes and better texture.

EGG WHITE WHIP TEST

The preparation of angel cake is a two stage ("A" and "B") process. Stage "A" is that part which determines the whip time. Following is the formula for an angel cake and the method for determining whip time.

In the standard angel cake formula all the percentages are based on the amount of flour and wheat starch in the formula. If the formula uses liquid egg whites (which contain approximately 12% egg solids) instead of dried egg whites, no water is added. When dried egg whites are used, enough water is added to the mix to equal the water in an equivalent amount of egg whites.

Stage A

|  | Grams |
|---|---|
| Granulated sugar | 120 |
| Egg white solids [1] | 37.5 |
| Salt (NaCl) | 2.5 |
| Acid salt (monobasic calcium phosphate) | 0.75 |
| Water [1] | 262.5 |

[1] For liquid egg whites—substitute 300% liquid egg whites and no added water.

Stage B

|  | Grams |
|---|---|
| Powdered sugar | 60 |
| Cake flour | 70 |
| Wheat starch | 30 |
| Monocalcium phosphate | 0.75 |
| Granulated sugar | 120 |

When using egg white solids, the dry ingredients at "Stage A" are dry blended before the water is added at 65° F. Four hundred and sixty-seven gms. of the foregoing mixture is reconstituted in a Hobart 5-quart mixer (Model N50) at low speed for 3 minutes, scraping the bowl after each minute. The egg white mixture is then whipped in the mixer on second speed to a meringue specific gravity of 0.165–0.175 gram per milliliter (g./ml.). The whip time is the period after reconstitution until the egg white mixture reaches a meringue specific gravity of 0.165–0.175 g./ml.

Angel cakes are prepared from the meringue of Stage "A" by folding in the Stage "B" ingredients to a final batter gravity of approximately 0.275, scaling 25 ounces of batter into a Mirro–5394M pan, tapping the pan lightly, and baking for 38 minutes at 375° F. in the oven.

Specific gravity determinations are made by filling a container of known volume and weight with whipped meringue and/or batter, scraping off the excess level with the top of the cup and weighing the same. The net weight in grams divided by the volume in cc. equals specific gravity.

Volume measurements are made approximately three hours after baking by carefully slicing the cake in half and measuring the vertical height in centimeters ½ inch from each outer edge and at each inner edge in the center portion of the cake. The average of these four measurements is recorded as volume in cm. Grain and texture are scored immediately following the volume measurement.

The mechanism of action of various additives on the whip time of egg whites is not clearly understood, as is shown by comparing the results of adding the non-plant whip time reducing agents and certain plant gums to "slow" whip egg solids and "fast" whip egg solids. A "fast whip" egg solids on the standard whip test has a whip time of approximately 5–6 minutes or less. A "slow whip" egg solids on the same test will have a whip time of approximately 10–12 minutes with no additives. Triethyl citrate (T.E.C) is an example of a non-plant whip time reducing agent. In Table I are the results of whip tests of a "fast whip" egg whites, and in Table II are the results with "slow whip" egg whites to which T.E.C. and guar gum has been added.

TABLE I.—FAST WHIP WHITES

| Sample | Additive, percent | Whip time, min. | Reduction, percent |
|---|---|---|---|
| Control (no additives) | 0 | 6 | |
| Guar gum | 0.08 | 5 | 16.7 |
| T.E.C. | 0.03 | 2 | 67.0 |
| Guar gum plus T.E.C. | { [1] 0.08 [2] 0.03 } | 2 | 67.0 |

[1] Guar.  [2] T.E.C.

TABLE II.—SLOW WHIP WHITES

| Sample | Additive, percent | Whip time, min. | Reduction, percent |
|---|---|---|---|
| Control | 0 | 10 | |
| Guar gum | 0.08 | 6 | 40 |
| T.E.C. | 0.03 | 7 | 30 |
| Guar gum plus T.E.C. | { [1] 0.08 [2] 0.03 } | 5 | 50 |

[1] Guar.  [2] T.E.C.

The percent additive in this invention is based on the weight of additive to the weight of liquid egg whites. For dried egg whites the percent is calculated on the weight of additive to the weight of dried eggs plus the water required to reconstitute the egg solids to liquid egg whites. For example, to prepare 100 grams of liquid egg whites containing 0.08% guar gum, 80 mg. of the gum would be incorporated into the liquid egg whites. For 0.08% guar gum dried egg whites, the guar gum added is based on the weight of liquid egg whites before drying, rather than the weight of egg solids. Therefore, 100 grams of liquid egg whites containing 80 mg. of guar gum yields approximately 12.5 gms. of dried egg whites containing the 80 mg. of guar gum. In normal baking practice, ⅛ as much dried egg whites is substituted in a formula for liquid egg whites. The seven-eighths difference in weight is water. This water is added separately.

Although guar gum at the 0.08% level decreases whip time of both "fast" and "slow" whip egg whites, the synergistic effect with T.E.C. occurs only on "slow" whip whites. Using such a combination does not hurt the whip time of "fast" whites in any fashion.

Many other gums have been tested for their effect on whip time on "slow" whip egg whites in the presence of T.E.C. In Table III are the results of using a variety of plant gums as well as several other substances used in the food industry to give "body" to food products. Only guar gum and okra gum have a synergistic effect on whip time, and co-pending application, Ser. No. 108,992 claims the combination of okra gum and egg whites. I have now determined that guar gum, alone and in combination with a second whip time reducing agent of the chemical type, and particularly in combination with okra gum and a second whip time reducing agent of the chemical type has the property of substantially reducing the whip time of both dried and frozen egg whites, particularly when the egg whites have a natural whip time of greater than 5 to 6 minutes.

The present invention relates to the incorporation of guar gum into egg whites, alone or in combination with chemical whipping aids and in combination with okra gum and chemical whipping aids, and to the methods of improving egg white whipping times hereinafter described and claimed.

TABLE III.—"SLOW WHIP" EGG ALBUMEN

| Sample | Amt. additive, percent | Whip time, min. | Reduction, percent | Foam gravity |
|---|---|---|---|---|
| Control | None | 10.5 | | .166 |
| T.E.C. | 0.03 | 7 | 33 | .166 |
| T.E.C. plus okra gum | 0.03 plus 0.04 | 3.5 | 67 | .163 |
| T.E.C. plus guar gum | 0.03 plus 0.04 | 4.5 | 57 | .164 |
| T.E.C. plus gum arabic | 0.03 plus 0.04 | 7 | 33 | .164 |
| T.E.C. plus gum karaya | 0.03 plus 0.04 | 7 | 33 | .164 |
| T.E.C. plus locust bean gum | 0.03 plus 0.04 | 7 | 33 | .161 |
| T.E.C. plus tragacanth gum | 0.03 plus 0.04 | 7 | 33 | .162 |
| T.E.C. plus methocel H.G. 15000 | 0.30 plus 0.04 | 7 | 33 | .162 |
| T.E.C. plus carboxymethylcellulose 7LP | 0.03 plus 0.04 | 7 | 33 | .164 |
| T.E.C. plus carboxymethylcellulose 7HCP | 0.03 plus 0.04 | 6.5 | 38 | .162 |
| T.E.C. plus dariloid Q (milk sol. algin) | 0.03 plus 0.04 | 7 | 33 | .161 |
| T.E.C. plus Kelcoloid O (propylene glycol alginate) | 0.03 plus 0.04 | 6.5 | 38 | .162 |
| T.E.C. plus Keltose (ammonium and calcium alginates) | 0.03 plus 0.04 | 7 | 33 | .162 |
| T.E.C. plus Kelcoloid HVF (propylene glycol alginate) | 0.03 plus 0.04 | 7 | 33 | .162 |
| T.E.C. plus Kelcosol (sodium alginate) | 0.03 plus 0.04 | 7 | 33 | .163 |
| T.E.C. plus Seakem #105 (carrageenan) | 0.03 plus 0.04 | 7 | 33 | .163 |
| T.E.C. plus Klucel (cellulose derivative) | 0.03 plus 0.04 | 7 | 33 | .163 |

The synergistic effect of guar gum and T.E.C. also occurs with other whip time reducing agents of the surface active type. In Table IV are the results of adding guar gum with sodium desoxycholate (N.A.D.), triacetin, and sodium lauryl sulfate.

TABLE IV.—SLOW WHIP EGG WHITES SOLIDS

| | Amt. additive, percent | Whip time, min. | Reduction, percent | Meringue gravity |
|---|---|---|---|---|
| Control | 0 | 10 | | .163 |
| Triacetin | 0.03 | 7½ | 25.0 | .163 |
| Triacetin plus guar gum | 0.03 plus 0.08 | 5¼ | 47.5 | .166 |
| N.A.D. | 0.1 | 5¼ | 47.5 | .162 |
| N.A.D. plus guar gum | 0.1 plus 0.08 | 2¼ | 77.5 | .150 |
| Sodium lauryl sulfate | 0.0125 | 9 | 10 | .166 |
| Sodium lauryl sulfate plus guar gum | 0.0125 plus 0.08 | 6 | 40 | .164 |

The combination of N.A.D. and guar gum gives the fastest whip time, but the foam stability is poor and the cakes tend to collapse. The quality of angel cake produced by each of these additives and a combination of additives is shown in Table V.

TABLE V.—ANGEL CAKE BAKE TESTS WITH DRIED EGG WHITES

| Additive | Amount additive, percent | Whip time, min. | Foam gravity | Batter gravity | Percent reduction | Volume (25 oz.) | Texture |
|---|---|---|---|---|---|---|---|
| 1. Control | | 10 | .162 | .292 | | 9.1 | Good−. |
| 2. T.E.C. | 0.03 | 7 | .161 | .276 | 30 | 9.2 | Fair+. |
| 3. Guar gum | 0.08 | 6 | .166 | .277 | 40 | 9.4 | Good. |
| 4. N.A.D. | 0.10 | 5¼ | .164 | .280 | 47.5 | 5.5 | Poor. |
| 5. Triacetin | 0.07 | 7½ | .161 | .271 | 25.0 | 9.7 | Fair+. |
| 6. T.E.C. plus guar gum | 0.03 plus 0.08 | 3 | .158 | .264 | 70.0 | 9.4 | Good−. |
| 7. N.A.D. plus guar gum | 0.10 plus 0.08 | 2 | .142 | .271 | 80.0 | 7.0 | Poor. |
| 8. Triacetin plus guar gum | 0.07 plus 0.08 | 5 | .166 | .271 | 50.0 | 9.6 | Good. |

The combination of guar gum and T.E.C. or triacetin improves cell structure and texture.

The optimal level of guar gum is approximately 0.08% as shown in Table VI. Larger amounts than 0.08% can be used, but with no improvement in functional effect. Below 0.02%, the whip time reducing effect of guar gum on egg whites is relatively small.

TABLE VI.—DRIED EGG WHITE WHIP TIME

| Sample | Amount of additive, percent | Whip time, min. | Reduction, percent | Foam gravity |
|---|---|---|---|---|
| Control | 0 | 10 | | .163 |
| Guar gum | 0.02 | 8½ | 15 | .162 |
| Do | 0.04 | 8 | 20 | .164 |
| Do | 0.06 | 7 | 30 | .164 |
| Do | 0.08 | 6 | 40 | .164 |
| Do | 0.10 | 6 | 40 | .164 |
| Guar gum plus T.E.C. | 0.08 plus 0.03 | 5 | 50 | .166 |
| T.E.C. | 0.03 | 7 | 30 | .165 |

Guar gum has its effect on whip time in a similar manner to okra gum in dried egg whites, but appears to function in a different way in liquid egg whites. Okra gum has little effect on the whip time of liquid egg whites. It is difficult to disperse, settles out and discolors the eggs. In Table VII are the results on the whip time of unpasteurized liquid egg whites to which guar gum has been added.

TABLE VII.—WHIP TIME OF UNPASTEURIZED LIQUID EGG WHITES

| Sample | Additive, percent | Whip time, min. | Reduction, percent | Foam gravity |
|---|---|---|---|---|
| Control | | 5 | | .178 |
| Guar gum | 0.04 | 3½ | 30 | .175 |
| Do | 0.04 | 4 | 20 | .175 |
| Guar gum plus T.E.C. | 0.04 plus 0.03 | 2½ | 50 | .165 |
| T.E.C. | 0.03 | 2½ | 50 | .163 |

Guar gum at the 0.04% level in unpasteurized liquid egg whites effectively decreases the whip time. When the same amount of guar gum is added to liquid eggs containing 0.03% T.E.C. there is no synergistic action.

The exact nature of the synergistic action of T.E.C. and guar gum in dried eggs is unknown. Similarly, the synergistic action of the plant and non-plant whip time reducing agents is not understood. Although no synergistic action occurred with unpasteurized liquid egg whites, the synergistic action occurred on pasteurized liquid egg whites as shown in Table VIII. The addition of 0.08% guar gum to pasteurized liquid eggs containing 0.025% of T.E.C. decreases whip time 40%. It may be that pasteurization causes an increase in whip time which T.E.C. alone cannot correct, but the addition of guar gum can improve. Guar gum alone effectively reduces the whip time of hydrogen peroxide pasteurized eggs 59%. In most cases the addition of guar gum to the liquid egg whites improves volume and texture of the cake.

TABLE VIII.—INFLUENCE OF GUAR GUM UPON WHIP TIME AND QUALITY OF ANGEL CAKES MADE WITH LIQUID EGG WHITES—PASTEURIZED AND UNPASTEURIZED

| Whites | Guar gum additive, percent | Whip time | Percent reduction | Specific gravity Meringue | Specific gravity Batter | Volume | Texture | Crumb pH |
|---|---|---|---|---|---|---|---|---|
| Unpasteurized | None | 3½ | | 0.167 | 0.274 | 9.9 | G− | 5.35 |
| Do | 0.08 | 2¼ | 36 | 0.166 | 0.265 | 10.2 | G | |
| Pasteurized—containing 0.025% T.E.C. | None | 3¾ | | 0.171 | 0.280 | 10.3 | G | 5.6 |
| Do | 0.08 | 2¼ | 40 | 0.171 | 0.272 | 10.6 | G | |
| H₂O₂ Pasteurized | None | 8 | | 0.175 | 0.282 | 10.0 | G− | 5.5 |
| Do | 0.08 | 3¼ | 59 | 0.175 | 0.278 | 10.1 | G+ | |

The synergistic action of two whip time reducing agents for egg whites appears to be limited to a combination of okra gum or guar gum plus a chemical type agent, such as T.E.C., triacetin, N.A.D. or sodium lauryl sulfate. These latter agents have some surface active properties. As shown in Table IX, the combination of okra gum and guar gum in equal amounts is no more effective in reducing whip time than an equal amount of either gum alone.

TABLE IX.—WHIP TIME OF DRIED EGG WHITES

| Sample | Amount additive, percent | Whip time, percent | Reduction, percent | Foam gravity |
|---|---|---|---|---|
| Control | 0 | 10.5 | | .166 |
| Guar gum | 0.04 | 7 | 33 | .166 |
| Okra gum | 0.04 | 6.5 | 38 | .166 |
| Guar gum-okra gum | 0.02 plus 0.02 | 6.5 | 38 | .166 |
| T.E.C. | 0.03 | 7 | 33 | .166 |
| T.E.C. plus guar gum | 0.03 plus 0.04 | 4.5 | 57 | .164 |
| T.E.C. plus okra gum | 0.03 plus 0.04 | 3.5 | 67 | .163 |
| T.E.C. plus guar gum plus okra gum | 0.03 plus 0.02 plus 0.02 | 2.5 | 76 | .157 |

If a non-plant whip time reducing agent such as T.E.C. is added to the combination of okra gum and guar gum, an enhanced synergistic effect is observed, the whip time of the egg whites being reduced from 10.5 minutes to 2.5 minutes.

Guar gum is an effective egg white reducing agent as a single additive to both dried or liquid egg whites and even more effective as the result of a synergistic action when combined with a non-plant egg white reducing agent, and most effective when incorporated in the egge whites with the non-plant whip time reducing agent and okra gum.

The amount of the second non-plant whip time reducing agent is at least about 0.01% with from about 0.01% to about 0.06% being preferred. The amount of okra gum is about 0.01% with about 0.01% to about 0.06% being preferred. These percentages are based on liquid egg whites as hereinbefore explained in connection with the percentages of guar gum.

EXAMPLE I

An angel cake using dried egg whites containing 0.08% guar gum (the percent of guar gum is based on the weight of the reconstituted egg whites) is prepared in accordance with the following formula.

Stage A

| | Grams |
|---|---|
| Granulated sugar | 132 |
| Dried egg whites containing 264 mg. guar gum | 41.3 |
| Salt | 2.75 |
| Monocalcium phosphate | 0.83 |
| Water (65–70° F.) ml | 290 |

The dry ingredients are blended together in the 5-quart bowl of a Hobart mixer, the water added and mixing continued in low speed for 3 minutes. The bowl is scraped down at one minute intervals during this initial period and the mix is beaten with a wire whip in second speed to a specific gravity of 0.166. The whip time is 6 minutes.

The 467 gms. of meringue are folded in manually with a wire whip with the ingredients in Stage B. The ingredients in Stage B are sifted twice before being folded in with the meringue.

Stage B

| | Grams |
|---|---|
| Powdered sugar | 66 |
| Cake flour | 77 |
| Wheat starch | 33 |
| Monocalcium phosphate | 0.83 |
| Granulated sugar | 132 |

Twenty-five ounces of batter is then scaled into a Mirro-5394M pan, the pan tapped lightly and then placed in the oven. Baking time is 38 minutes at 375° F. After baking, the pan is inverted and the product allowed to cool for at least one hour before removing the cake.

The average vertical height is 9.4 cm. and the texture is rated good.

EXAMPLE II

An angel cake is prepared in the same manner as described in Example I except that 100 mgs. of T.E.C. (0.03%) is used as a second additive. Following the initial rehydration period, the mixture is beaten for 3 minutes in second speed to a specific gravity of 0.158. A final batter specific gravity of 0.264 is obtained after folding in the stage B ingredients.

This produces a cake having a vertical height of 9.4 cm., the texture being rated as good.

EXAMPLE III

Employing the procedure described in Example II, an angel cake is prepared in which triacetin at a level of 0.07% (231 mg.) is substituted for triethyl citrate.

The meringue stage ingredients are beaten for 5 minutes to a specific gravity of 0.166. The final batter specific gravity is 0.271.

The height of this cake is 9.6 cm. and the texture good.

EXAMPLE IV

An angel cake is prepared with liquid egg whites containing one hundred and thirty-two mg. guar gum. The gum is dissolved in 10 ml. of water and mixed with liquid unpasteurized egg whites. The percentage of guar gum is 0.04% based on the liquid egg whites. These liquid egg whites are used in the following formula.

Stage A

|  | Grams |
|---|---|
| Granulated sugar | 132 |
| Liquid egg whites | 330 |
| Salt | 2.75 |
| Monocalcium phosphate | 1.66 |

Stage B

|  | Grams |
|---|---|
| Powdered sugar | 66 |
| Cake flour | 77 |
| Wheat starch | 33 |
| Monocalcium phosphate | 1.66 |
| Granulated sugar | 132 |

To the liquid eggs in a mixture bowl are added the rest of the ingredients in the formula at Stage A. The meringue is whipped to a medium stiff peak—a specific gravity of 0.175. The whip time is 3.5 minutes. The ingredients at Stage B are folded in with the meringue and the batter (specific gravity 0.280) is scaled off at 24 ounces. The cake has an excellent volume of 11.3 cm. and the texture is rated good.

EXAMPLE V

Liquid egg whites containing 264 mgs. of guar gum (0.08%) are prepared by dispersing the guar gum in 530 mg. of propylene glycol. The dispersion of guar gum in propylene glycol is mixed in with 330 gms. of liquid pasteurized egg whites, frozen at −20° F. and held for one week.

The egg whites are thawed and an angel cake prepared, as in Example IV. The Stage A ingredients whip in 4 minutes to a specific gravity of 0.166, and the resulting cake has a height of 10.8 cm. and good grain and texture.

This invention is intended to cover all changes and modifications of the examples of the invention herein chosen for purposes of the disclosure which do not constitute departures from the spirit and scope of the invention.

What is claimed is:

1. A method of decreasing the whip time of egg whites including the step of adding at least about 0.02% by weight of guar gum based on the weight of egg white solids and water.

2. The method of claim 1 wherein the egg whites are dried egg whites.

3. The method of claim 1 wherein the egg whites are unpasteurized liquid egg whites.

4. The method of claim 1 wherein the egg whites are pasteurized egg whites.

5. The method of claim 1 including adding at least about 0.01% of a chemical egg white whip time reducing agent, said combination of additives synergistically reducing the whip time of egg whites by an amount greater than the additives alone.

6. The method of claim 2 including adding at least about 0.01% of a chemical egg white whip time reducing agent, said combination of additives synergistically reducing the whip time of egg whites by an amount greater than the additives alone.

7. The method of claim 4 including adding at least about 0.01% of a chemical egg white whip time reducing agent, said combination of additives synergistically reducing the whip time of egg whites by an amount greater than the additives alone.

8. The method of claim 7 wherein the egg whites are $H_2O_2$ pasteurized.

9. The method of claim 1 including adding at least about 0.01% of a chemical egg white whip time reducing agent and at least about 0.01% of okra gum, said combination of additives synergistically reducing the whip time of egg whites by an amount greater than the additives alone.

10. The method of claim 2 including adding at least about 0.01% of a chemical egg white whip time reducing agent and at least about 0.01% of okra gum, said combination of additives synergistically reducing the whip time of egg whites by an amount greater than the additives alone.

11. The method of claim 4 including adding at least about 0.01% of a chemical egg white whip time reducing agent and at least about 0.01% of okra gum, said combination of additives synergistically reducing the whip time of egg whites by an amount greater than the additives alone.

12. The method of claim 11 wherein the egg whites are $H_2O_2$ pasteurized.

13. The method of claim 1 including about 0.02% to about 0.08% of guar gum.

14. The method of claim 13 including about 0.01% to about 0.06% of a chemical whip time reducing agent.

15. The method of claim 13 including about 0.01% to about 0.06% of a chemical whip time reducing agent and about 0.01% to about 0.06% of okra gum.

16. The method of claim 3 including about 0.02% to about 0.08% guar gum.

17. The method of claim 14 wherein the chemical whip time reducing agent is triethyl citrate.

18. The method of claim 14 wherein the chemical whip time reducing agent is triacetin.

19. The method of claim 14 wherein the chemical whip time reducing agent is sodium desoxycholate.

20. The method of claim 14 wherein the chemical whip time reducing agent is sodium lauryl sulfate.

21. The method of claim 15 wherein the chemical whip time reducing agent is triethyl citrate.

22. The method of claim 15 wherein the chemical whip time reducing agent is triacetin.

23. The method of claim 15 wherein the chemical whip time reducing agent is sodium desoxycholate.

24. The method of claim 15 wherein the chemical whip time reducing agent is sodium lauryl sulfate.

25. A composition consisting essentially of egg white and powdered guar gum in an amount sufficient to reduce the whipping time of said egg white.

26. A composition consisting essentially of dried egg white and powdered guar gum, said powdered guar gum dispersed throughout the dried egg white in an amount sufficient to reduce the whipping time of said egg white.

27. A solid composition consisting essentially of a mixture of dried egg white and guar gum, in an amount sufficient to reduce the whipping time of said egg white.

28. A composition consisting essentially of liquid natural egg white containing solids of approximately 12.5% by weight and powdered guar gum ranging from at least about 0.02% by weight.

29. A composition consisting essentially of liquid natural egg white and powdered guar gum, said powdered guar gum in amounts ranging from a trace to 10% by weight.

30. A composition consisting essentially of liquid natural egg white, water and guar gum, said water in amounts ranging from 0–90% by weight and said guar gum in amounts ranging from a trace to 10% by weight.

31. A process for producing an improved egg white comprising the steps of adding guar gum to said egg white in an amount sufficient to reduce the whipping time of said egg white, and mixing said egg white and said guar gum to attain dispersion of the guar gum throughout the egg white matrix.

32. A process for producing an improved solid egg white comprising the steps of mixing powdered guar gum into liquid egg white in an amount sufficient to reduce the whipping time of said egg white.

33. A process for producing an improved solid egg white comprising the steps of adding powdered guar gum to dried egg white in an amount sufficient to reduce the whipping time of said egg white, mixing said egg white and guar gum to attain dispersion of said guar gum in said egg white.

34. In a process for producing a meringue wherein whipped egg white is employed as an essential ingredient, the step comprised of adding guar gum to said egg white before being whipped and in an amount sufficient to reduce the whipping time of said egg white.

35. In a process for producing an angel cake wherein whipped egg white is employed as an essential ingredient, the step comprised of adding guar gum to said egg white before being whipped and in an amount sufficient to reduce the whipping time of said egg white.

36. In a process for producing an icing wherein whipped egg white is employed as an essential ingredient, the step comprised of adding guar gum to said egg white before being whipped and in an amount sufficient to reduce the whipping time of said egg white.

References Cited

UNITED STATES PATENTS

| | | | |
|---|---|---|---|
| 2,881,077 | 4/1959 | Kline et al. | 99—113 |
| 2,933,397 | 4/1960 | Maturi et al. | 99—113 |
| 3,028,245 | 4/1962 | Mink | 99—210 |
| 3,378,376 | 4/1968 | Sebring | 99—92 |

LIONEL M. SHAPIRO, Primary Examiner

U.S. Cl. X.R.

99—210